Feb. 20, 1951
C. E. SWALWELL
2,542,163
GARMENT HANGER FOR VEHICLES
Filed Dec. 6, 1948
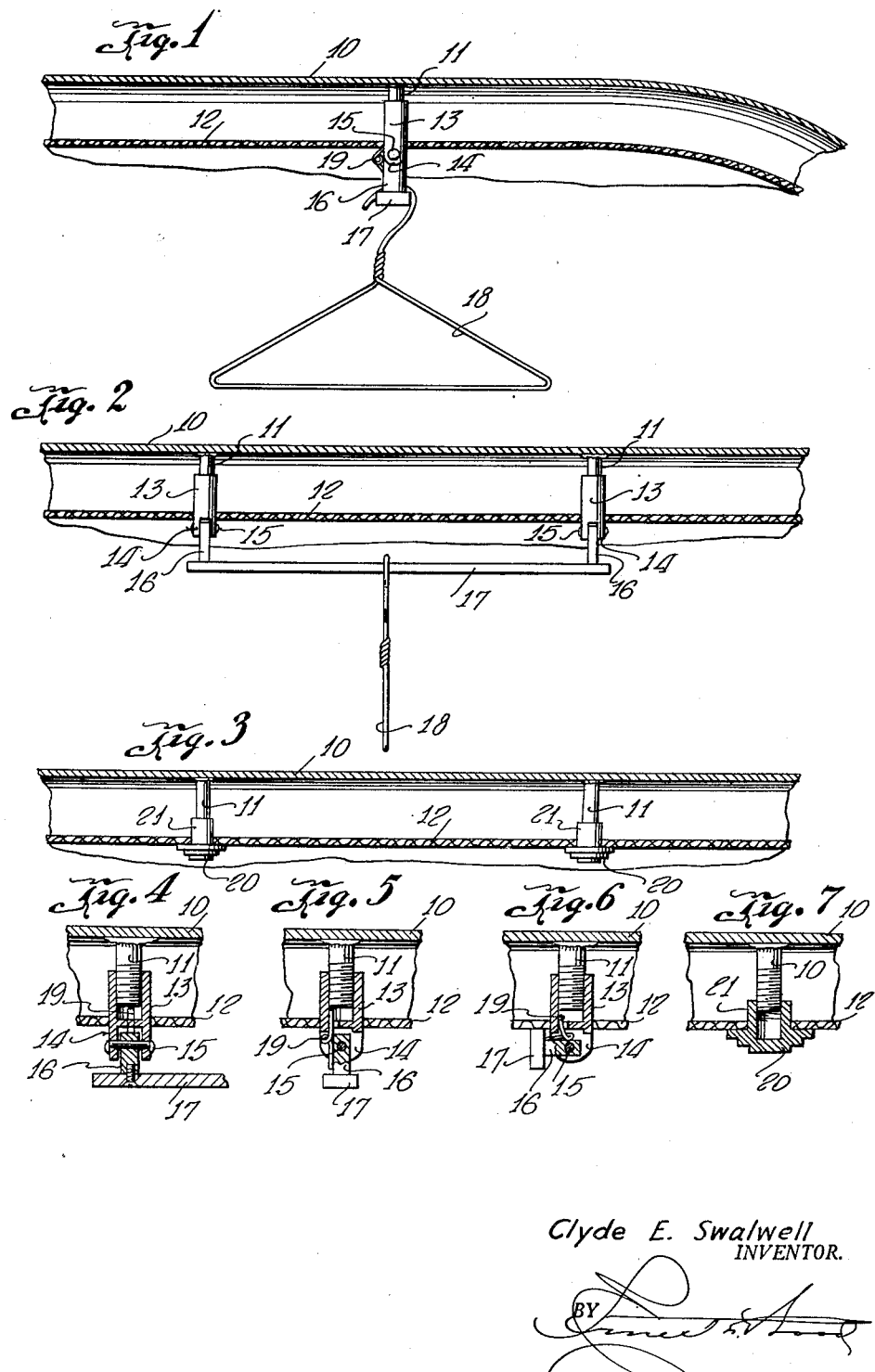
Clyde E. Swalwell
INVENTOR.
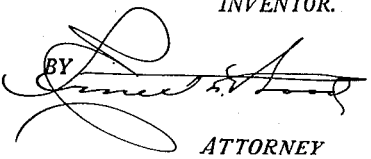
ATTORNEY Patented Feb. 20, 1951

2,542,163

UNITED STATES PATENT OFFICE 2,542,163

GARMENT HANGER FOR VEHICLES

Clyde E. Swalwell, Dallas, Tex.

Application December 6, 1948, Serial No. 63,735

4 Claims. (Cl. 224—42.1)

This invention relates to garment carriers for automobiles and more particularly to such carriers as a permanent fixture in automobiles.

The principal object of the invention is to provide a convenient support for garment hangers consisting of a pair of suspension members affixed to and depending from the undersurface of a vehicle top in spaced apart relationship and to which is attached a hanger support by means of a pair of mounting members, the latter being readily removable from the suspension members.

Another object of the invention is to provide a carrier for clothing on which the latter may be suspended by hangers so that the latter will be disposed in parallelism with the rear of the front seat of an automobile, that is to say, within the space between the front and rear seats of a two or four door sedan, the garments being parallel with the space between the seats to afford ample room for one or more passengers on the rear seats and yet insuring against wrinkling the garments so that they may be kept in condition against the time when they are to be worn.

Still another object of the invention is to provide a garment carrier for automobiles in which the hanger support, when not in use, is held automatically in folded position against the ceiling upholstery of the vehicle and thus out of the way. Moreover, the support may be entirely removed from its suspension and the openings in the ceiling upholstery through which the mounting members engage the suspension members are concealed by garnish caps which are readily attachable thereto.

With the foregoing objects in view, the invention has further reference to certain features of accomplishment which will become apparent as the description proceeds, taken in connection with the accompanying drawing wherein:

Figure 1 is a fragmentary view of an automobile top in transverse section, showing an end elevational view of the invention installed.

Figure 2 is a side elevational view of the invention installed.

Figure 3 is a fragmentary view of an automobile top in longitudinal section showing garnish caps substituted for the garment carrier.

Figure 4 is a fragmentary view of the invention in vertical section showing the relationship of the garment hanger support, mounting and suspension.

Figure 5 is a view similar to Figure 4 but rotated 90 degrees.

Figure 6 is a view similar to Figure 5 but showing the garment hanger support in folded position, and Figure 7 is a sectional view showing a garnish cap in place of the mounting on a suspension member.

Continuing with a more detailed description of the drawing, reference to Figure 1 will reveal the steel top 10 of an automobile in transverse section and to the undersurface of the top 10 is welded one end of a short length of rod or pipe 11, the opposite end thereof terminating short of the ceiling upholstery 12, as shown in Figures 4 to 7.

The lower end of each of the suspension members 11 is threaded to be received by the internally threaded end of a mounting member consisting of a tubular body 13 having a bifurcated end 14. The mounting members 13 each extend through an aperture provided therefor in the ceiling 12 to engage the fixed suspension members 11 and pivoted at 15 in the bifurcated end of each mounting member 13 is a right angular arm 16 of a garment hanger support 17.

The position and arrangement of the garment hanger in relation to the top of the vehicle disposes the supporting bar 17 at right angles to the back of the front seat and within the space between the front and rear seats of the automobile, hence the garment hangers 18 will be suspended in parallelism with the seats. In this manner, where the spacing of the front and rear seats is close, the garments on the hangers 18 will not be unduly crowded and thus wrinkled. Also, there is room for more garments than if they were disposed at right angles to the seats as well as for passengers in the rear seat.

Referring to Figures 4, 5 and 6, it will be observed that a torsion spring 19 is employed to normally exert a force on the supporting bar 17 tending to urge the same upwardly against the ceiling 12, which is the folded position of the support. One end of the spring 19 is affixed to the arm 16 of the support, as by welding, while the opposite end is secured in like manner within the tubular mounting member 13. The support, weighted by garments overcomes the resistance of the spring but when the garments are removed, the support is automatically moved to folded position by the spring 19.

Should it be desired to remove the garment support entirely, a garnish cap 20 is provided to replace the same, the cap having an internally threaded extension 21 which is screwed onto the threaded end of the depending suspension member 11, in the manner shown in Figures 3 and 7.

Manifestly, the construction as shown and described is capable of some modification and such modification as may be construed to fall within the scope and meaning of the appended claims is also considered to be within the spirit and intent of the invention.

What is claimed is:

1. A garment carrier for an automobile comprising a pair of externally threaded tubular members affixed to and depending from the underside of the top of said automobile and spaced apart longitudinally thereof and terminating above the lining of said top, a mounting member threadedly attached to each of said tubular members, said mounting members each having a bifurcated lower end and extending through an opening in said top lining, a garment hanger supporting bar having a right-angular arm adjacent each end pivoted in the bifurcated end of a mounting member and torsion spring means for normally urging said supporting bar into folded contiguity with said top lining.

2. A garment carrier for an automobile comprising a pair of externally threaded and tubular suspension members affixed to and depending from the undersurface of the top of said automobile and spaced apart longitudinally of said top, said suspension members terminating above the lining of said top, a tubular mounting member threadedly attached to each of said suspension members and extending through an opening in said lining, a garment hanger supporting bar having an end attached pivotally to each of said mounting members and means normally urging said supporting bar into folded position.

3. In a garment carrier for an automobile, tubular suspension members affixed to and depending from the undersurface of the top of said automobile in longitudinally spaced apart relationship and having threaded lower ends, a mounting member extending upwardly through apertures in the top lining of said automobile and threadedly engaging said suspension members and a bar swingably attached to said mounting members for disposition at right angles to the back of the front seat of automobile and adapted to support a plurality of garment hangers.

4. A garment carrier as set forth in claim 3 in which the suspension members are each adapted to receive garnish caps to substitute for the mounting members and garment hanger supporting bar.

CLYDE E. SWALWELL.

REFERENCES CITED

The following references are of record in the file of this patent:

UNITED STATES PATENTS

| Number | Name | Date |
|---|---|---|
| 1,147,167 | Herrmann | July 20, 1915 |
| 1,786,250 | Knoth | Dec. 23, 1930 |
| 2,447,908 | Hoots | Aug. 23, 1948 |